US009209004B2

(12) United States Patent
Yamada

(10) Patent No.: US 9,209,004 B2
(45) Date of Patent: Dec. 8, 2015

(54) METHOD AND SYSTEM FOR PROCESSING MASS SPECTROMETRY DATA, AND MASS SPECTROMETER

(71) Applicant: SHIMADZU CORPORATION, Kyoto-shi, Kyoto (JP)

(72) Inventor: Yoshihiro Yamada, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 487 days.

(21) Appl. No.: 13/670,396

(22) Filed: Nov. 6, 2012

(65) Prior Publication Data

US 2013/0116934 A1 May 9, 2013

(30) Foreign Application Priority Data

Nov. 8, 2011 (JP) ................................ 2011-244600

(51) Int. Cl.
*H01J 49/00* (2006.01)
*G06F 19/00* (2011.01)

(52) U.S. Cl.
CPC ........... *H01J 49/0036* (2013.01); *H01J 49/004* (2013.01)

(58) Field of Classification Search
CPC . H01J 49/0036; H01J 49/004; H01J 49/0027; H01J 49/145; H01J 49/165; G01R 33/465; G06F 19/70; G06F 19/703
USPC .............................. 702/23, 28, 181; 250/282
See application file for complete search history.

(56) References Cited

U.S. PATENT DOCUMENTS

| | | | | |
|---|---|---|---|---|
| 6,917,037 | B2 | 7/2005 | Ootake et al. | 250/282 |
| 2004/0169138 | A1 | 9/2004 | Ootake et al. | 250/281 |
| 2007/0221835 | A1 * | 9/2007 | Raftery et al. | 250/282 |

FOREIGN PATENT DOCUMENTS

| | | |
|---|---|---|
| JP | 2004-257922 | 9/2004 |
| JP | 3766391 | 2/2006 |

OTHER PUBLICATIONS

Nakorchevsky et al., "Exploring Data-Dependent Acquisition Strategies with the Instrument Control Libraries for the Thermo Scientific Instruments", ASMS-2010.
Examination Report received for Japanese Patent Application No. 2011-244600 mailed Sep. 24, 2014, 3 pages (1 page of English Translation and 2 pages of official copy).

* cited by examiner

*Primary Examiner* — John H Le
(74) *Attorney, Agent, or Firm* — Morgan, Lewis & Bockius LLP

(57) ABSTRACT

Provided is a method for quantitatively estimating the probability of substance identification based on the result of an $MS^2$ analysis using a certain $MS^1$ peak as the precursor ion, before performing the $MS^2$ analysis. Based on the result of $MS^1$ and $MS^2$ analyses and substance identification performed for each of a number of fractionated samples obtained from a known preparatory sample, an identification probability estimation model creator grasps m/z and S/N ratios of $MS^1$ peaks having high probabilities of successful identification, calculates a parameter which determines the order of $MS^1$ peaks and a parameter representing an identification probability estimation model, and stores the parameters in a memory. When identifying a substance, an approximate order is calculated for an $MS^1$ peak obtained by the analysis. The identification probability for that peak is estimated from the approximate order with reference to the identification probability estimation model.

6 Claims, 9 Drawing Sheets

METHOD AND SYSTEM FOR PROCESSING MASS SPECTROMETRY DATA, AND MASS SPECTROMETER

TECHNICAL FIELD

The present invention relates to a mass spectrometry data processing method for processing an $MS^n$ spectrum collected by a mass spectrometer capable of an $MS^n$ analysis to identify a substance in a sample. It also relates to a mass spectrometry data processing system using the same method, and a mass spectrometer.

BACKGROUND ART

In bioscience research, medical treatment, drug development and similar fields, it has become increasingly important to comprehensively identify various substances, such as proteins, peptides, nucleic acids and sugar chains. In particular, when aimed at proteins or peptides, such a comprehensive analysis method is called "shotgun proteomics." For such analyses, the combination of a chromatographic technique, such as a liquid chromatograph (LC) or capillary electrophoresis (CE), with an $MS^n$ mass spectrometer (tandem mass spectrometer) has proven itself to be a very powerful technique.

A procedure of a commonly known method for comprehensively identifying various kinds of substances in a biological sample by means of an $MS^n$ mass spectrometer is as follows:

[Step 1] Various substances contained in a sample to be analyzed are separated by an appropriate method, e.g. LC or CE. The thereby obtained eluate is preparative-fractionated to prepare a number of small amount samples. (Each of the small amount samples obtained by preparative fractionation is hereinafter called the "fractionated sample.") In the preparative fractionation of a sample, the sample may be fractionated by various methods: in one method, small amount samples only around peaks are collected; in another method, small amount samples are collected continuously at regular predetermined intervals of time, or small amount samples are constantly collected in the same amount. In any method, it is preferred that every substance in the sample must be included in one of the fractionated samples without fail.

[Step 2] For each fractionated sample, an $MS^n$ spectrum is obtained, and a peak or peaks that are likely to have originated from a substance or substances to be identified is selected on the $MS^n$ spectrum.

[Step 3] Using the peak selected in Step 2 as the precursor ion, an $MS^2$ analysis is performed on the fractionated sample concerned. Then, based on the result of this analysis, a database search or de novo sequencing is performed to identify a substance contained in the fractionated sample.

[Step 4] If no specific substance has been identified with sufficient accuracy, an $MS^2$ analysis using another peak on the $MS^1$ spectrum as the precursor ion is performed, or a higher-order $MS^n$ analysis (i.e. n=3 or greater) using a specific ion observed on the $MS^2$ spectrum as the precursor ion is performed. Then, a database search, de novo sequencing or similar data processing based on the result of the analysis is performed to identify a substance or substances contained in the fractionated sample.

[Step 5] The processes of Steps 2 through 4 are performed for each of the fractionated samples to comprehensively identify various substances contained in the original sample.

To identify each of the substances with high accuracy by the previously described comprehensive identification process, it is desirable that each fractionated sample should contain a small number of kinds of substances (most desirably, only one kind). To achieve this, it is necessary to shorten the period of each fractionating cycle, which significantly increases the number of cycles of fractionation. Considering that, to identify as many substances as possible within a limited period of time, i.e. to improve the throughput of the comprehensive identification of one or more substances contained in a fractionated sample, one or more precursor ions having a higher probability of successful identification (which is hereinafter called the "identification probability") should be preferentially chosen for the $MS^n$ analysis.

One conventional method for selecting a precursor ion for an $MS^2$ analysis from the peaks observed on an $MS^n$ spectrum obtained for a given sample is to sequentially select the peaks on the spectrum in descending order of strength (see Patent Document 1). For example, if the length of time for the $MS^2$ analysis of one sample is limited, the analyzing system is controlled so that a predetermined number of peaks will be sequentially selected as the precursor ion in descending order of their strengths. In another commonly known method, all the peaks, without limiting the number of peaks, having strengths equal to or larger than a predetermined threshold are selected as precursor ions.

These methods seem to entirely rely on the assumption that an ion having a higher peak strength ensures a higher identification probability. Although this assumption is not qualitatively wrong, it should be noted that the peak strength does not always correspond to the value of identification probability. For example, suppose that there are multiple peaks that can be chosen as a precursor ion. In some cases, choosing any one of these peaks will result in successful identification with high probability, while in other cases successful identification can be expected only when a specific peak among them is chosen. Such a difference cannot be quantitatively determined in advance (i.e. before the $MS^2$ analysis is performed). This is one of the reasons that deteriorate the efficiency of the comprehensive identification.

BACKGROUND ART DOCUMENT

Patent Document

Patent Document 1: JP-B 3766391

Non-Patent Document

Non-Patent Document 1: Aleksey Nakorchevsky et al., "Exploring Data-Dependent Acquisition Strategies with the Instrument Control Libraries for the Thermo Scientific Instruments", ASMS-2010

SUMMARY OF THE INVENTION

Problem to be Solved by the Invention

The aforementioned problem results from the lack of the process of quantitatively evaluating the identification probability of each peak on the $MS^{n-1}$ spectrum and selecting the precursor ion based on the result of the quantitative evaluation.

The present invention has been developed to solve the aforementioned problem, and one objective thereof is to provide a mass spectrometry data processing method and system capable of quantitatively estimating the identification probability for each peak on an $MS^{n-1}$ spectrum before identifying a substance by a database search or similar data processing based on the $MS^n$ spectrum data.

Another objective of the present invention is to provide a mass spectrometer in which the accuracy and efficiency of identification can be improved by a control and process based on quantitative data of the identification probability, for example, in such a manner that a precursor ion having a higher identification probability is preferentially selected for an $MS^n$ analysis and a substance is identified by using the result of this analysis, or that only one or more precursor ions having identification probabilities equal to or higher than a specific level are selected for the $MS^n$ analysis and a substance is identified by using the result of this analysis.

Means for Solving the Problems

A first aspect of the present invention aimed at solving the previously described problem is a mass spectrometry data processing method for identifying a substance contained in each of a plurality of fractionated samples obtained by separating various substances contained in a sample according to a predetermined separation parameter and fractionating the sample, based on $MS^n$ spectra obtained by $MS^n$ analyses (where n is an integer equal to or greater than two) respectively performed for the plurality of fractionated samples, including:

a) an identification probability estimation model creation step, in which: (a1) order information for determining the order of $MS^{n-1}$ peaks found by $MS^{n-1}$ analyses for a plurality of fractionated samples obtained from a preparatory sample is derived from information on the $MS^{n-1}$ peaks and the result of substance identification based on the results of $MS^n$ analyses which respectively use the $MS^{n-1}$ peaks as a precursor ion, (a2) an identification probability estimation model is created on the basis of the relationship between the cumulative number of $MS^n$ peaks and the number of successful identifications determined through a series of $MS^n$ analyses and identifications in which a plurality of $MS^{n-1}$ peaks originating from the same kind of samples are sequentially selected as a precursor ion according to the aforementioned order, and (a3) the aforementioned order information, and identification probability estimation model information representing the aforementioned identification probability estimation model, are memorized;

b) a peak order calculation step, in which, for $MS^{n-1}$ peaks found by an $MS^{n-1}$ analysis of at least one fractionated sample obtained from a sample to be identified, the order of the $MS^{n-1}$ peaks is calculated by using the order information; and c) an identification probability estimation step, in which an estimated value of the identification probability of each of the $MS^{n-1}$ peak is calculated from the order of the $MS^{n-1}$ peaks calculated in the peak order calculation step, with reference to the identification probability estimation model derived from the identification probability estimation model information, wherein the estimated value of the identification probability for an $MS^n$ analysis and identification using, as a precursor ion, an $MS^{n-1}$ peak corresponding to a fractionated sample obtained from the sample to be identified is obtained before the $MS^n$ analysis is performed.

In this method, the separation of various kinds of substances contained in a sample can be achieved by a liquid chromatograph (LC), capillary electrophoresis or any other means. In the case of the LC or similar device using a column, the aforementioned separation parameter is time (retention time). In the case of the CE, the separation parameter is mobility.

There is no limitation on the method for identifying a substance based on an $MS^n$ spectrum. For example, de novo sequencing, MS/MS ion search or any algorithm can be used.

In the identification probability estimation model creation step of the mass spectrometry data processing method according to the first aspect of the present invention, the order information and identification probability estimation model information of $MS^{n-1}$ peaks are derived from "known" data, i.e. a set of data containing all the information on an $MS^n$ analyses and the result of identification obtained by using the outcome of the $MS^n$ analyses on a preparatory sample (or samples). In order that the largest possible number of substances among many substances contained in a sample may be identified by using the results of $MS^n$ analysis and identification using a small number of $MS^{n-1}$ peaks, the order of the $MS^{n-1}$ peaks should be determined so that $MS^{n-1}$ peaks which result in successful identification are gathered at the highest possible levels of propriety. However, such a restriction on the order of the $MS^{n-1}$ peaks is unnecessary if it is merely necessary to estimate the identification probability of each of the $MS^{n-1}$ peaks.

To create a good order of $MS^{n-1}$ peaks in the identification probability estimation model creation step, for example, it is preferable to examine the distribution of the $MS^{n-1}$ peaks based on their mass-to-charge ratios and S/N ratios, and determine their order so that a high order of priority is given to each $MS^{n-1}$ peak included in an area dense with $MS^{n-1}$ peaks which have resulted in successful identification. An S/N ratio of an $MS^n$ peak can be computed from the strength of the $MS^n$ peak and a noise level derived from the $MS^1$ spectrum (a profile that has not undergone any processing, such as a noise removal) in which the concerned peak is located.

Suppose the case of determining the relationship between the cumulative number of $MS^n$ peaks and the number of successful identifications achieved through a series of $MS^n$ analyses and identification while a plurality of ordered $MS^{n-1}$ peaks are sequentially selected as a precursor ion according to their order. If, as described previously, their order is determined so that $MS^{n-1}$ peaks which have resulted in successful identification are gathered at higher levels of priority, the relationship between the cumulative number of $MS^n$ peaks and the number of successful identifications will be like a line which increases in a staircase pattern. Accordingly, in the identification probability estimation model creation step, for example, it is preferable to perform a fitting for determining a continuous relationship between the cumulative number of $MS^n$ peaks and the number of successful identifications to obtain a smooth fitting curve, and to differentiate this curve to obtain a relationship between the order of the $MS^n$ peaks and the identification probability. As a result, an identification probability estimation model for deriving an identification probability corresponding to any level of priority of the $MS^n$ peaks is obtained.

An appropriate order of the $MS^{n-1}$ peaks and an appropriate identification probability estimation model depend on the kind of sample, or more exactly, on the kinds of substances contained in the sample. In other words, the same $MS^{n-1}$ peak order information and the same identification probability estimation model information can be used in the case of identifying the same kind of substance or a similar kind of substance. For example, when the analysis is aimed at identifying proteins in a biological sample, the $MS^{n-1}$ peak order information and the identification probability estimation model information can be previously prepared on the basis of $MS^n$ peaks or other data obtained for a preparatory sample containing various kinds of previously identified proteins.

When it is necessary to know the identification probability for an $MS^{n-1}$ peak found by an $MS^{n-1}$ analysis of a fractionated sample obtained from a sample containing unknown substances before performing an $MS^n$ analysis for this peak, the order of the $MS^{n-1}$ peak in question is calculated in the peak order calculation step by using the previously obtained $MS^{n-1}$ peak order information. The data of the $MS^{n-1}$ peak order information used as the basis for this calculation are the data obtained for specific $MS^{n-1}$ peaks; the order is expressed by integers (discrete values). To more appropriately determine the identification probability of any given $MS^n$ peak, the order should preferably be expressed in continuous values rather than discrete values. Therefore, for example, it is preferable to calculate an approximate order for each $MS^{n-1}$ peak by interpolation or another method. In the identification probability estimation step, with reference to the identification probability estimation model derived from the identification probability estimation model information, an estimated value of the identification probability for the $MS^{n-1}$ peak is calculated from the order of this peak calculated in the aforementioned manner. Thus, the probability of successful identification of an $MS^{n-1}$ peak based on the result of an $MS^n$ analysis of the peak can be quantitatively estimated without actually performing the $MS^n$ analysis.

In the case of identifying a substance using the mass spectrometry data processing method according to the present invention, the information obtained in the identification probability estimation model creation step can be previously stored. The stored information can be used to quantitatively evaluate the identification probability of each $MS^{n-1}$ peak when identifying substances contained in a sample that is similar to the sample used in the creation of that information.

Thus, the second aspect of the present invention aimed at solving the previously described problem provides a mass spectrometry data processing system for identifying a substance by using the mass spectrometry data processing method according to the first aspect of the present invention, including:

a) an identification probability estimation information memory in which the order information and the identification probability estimation model information representing the identification probability estimation model are stored;

b) a peak order calculator for calculating an order of $MS^{n-1}$ peaks found by an $MS^{n-1}$ analysis of at least one fractionated sample obtained from a sample to be identified, using the order information stored in the identification probability estimation information memory; and c) an identification probability estimator for calculating an estimated value of the identification probability of an $MS^{n-1}$ peak from the order of the $MS^{n-1}$ peaks calculated by the peak order calculator with reference to the identification probability estimation model derived from the identification probability estimation model information stored in the identification probability estimation information memory.

Naturally, the mass spectrometry data processing system according to the second aspect of the present invention may further include an identification probability estimation model creator having the functions of: (1) deriving order information for determining an order of the $MS^{n-1}$ peaks found by $MS^{n-1}$ analyses for a plurality of fractionated samples obtained from a preparatory sample, from information on the $MS^{n-1}$ peaks and a result of substance identification based on the results of $MS^n$ analyses which respectively use the $MS^{n-1}$ peaks as a precursor ion; (2) creating an identification probability estimation model on the basis of the relationship between the cumulative number of $MS^n$ peaks and the number of successful identifications determined through a series of $MS^n$ analyses and identifications in which the $MS^{n-1}$ peaks are sequentially selected as a precursor ion according to the aforementioned order; and (3) storing the aforementioned order information and identification probability estimation model information representing the aforementioned identification probability estimation model in the identification probability estimation information memory.

The estimated value of the identification probability calculated in the mass spectrometry data processing method according to the first aspect of the present invention or the mass spectrometry data processing system according to the second aspect of the present invention can be used for controlling a mass spectrometer in performing an $MS^n$ analysis for substance identification. There are various possibilities of control modes using the estimated value of the identification probability.

Thus, the present invention provides a mass spectrometer incorporating the mass spectrometry data processing system according to the second aspect of the present invention, including:

d) a precursor ion selector for obtaining, in advance of an $MS^n$ analysis of a fractionated sample obtained from a sample to be identified, an estimated value of the identification probability for an $MS^n$ analysis and identification using an $MS^{n-1}$ peak corresponding to the fractionated sample as a precursor ion, and for determining, based on the estimated result, whether or not the $MS^n$ analysis using the $MS^{n-1}$ peak as the precursor ion should be performed; and e) an analysis controller for performing an $MS^n$ analysis using, as the precursor ion, an $MS^{n-1}$ peak for which it has been determined by the precursor ion selector that the $MS^n$ analysis should be performed.

More specifically, for example, the precursor ion selector may compare the estimated values of the identification probability of a plurality of $MS^{n-1}$ peaks, sequentially select the $MS^{n-1}$ peaks in descending order of the estimated values of the identification probability, and perform an $MS^n$ analysis using the selected $MS^{n-1}$ peak as the precursor ion. By this operation, a greater number of substances can be identified by a relatively small number of $MS^n$ analyses. In this control mode, it is also possible to discontinue the identification process for a concerned sample before the $MS^n$ analyses for all the $MS^{n-1}$ peaks are completed. For example, the process can be discontinued when a predetermined number of $MS^n$ analyses have been completed, when the number of identified substances has reached a predetermined value, or when the rate of increase in the number of identified substances has significantly decreased. The precursor ion selector may select only $MS^1$ peaks whose identification probabilities have been estimated to be equal to or greater than a predetermined value, and perform an $MS^n$ analysis using each of these peaks as the precursor ion.

Effect of the Invention

By the mass spectrometry data processing method according to the first aspect of the present invention and the mass spectrometry data processing system according to the second aspect of the present invention, the probability of successful identification of a substance using the result of an $MS^n$ analysis for an $MS^{n-1}$ peak can be quantitatively estimated without actually performing the $MS^n$ analysis or identification process. Therefore, for example, it is possible to quantitatively determine which of a plurality of $MS^n$ peaks should be selected as the precursor ion to obtain a better result of identification. This quantitative determination can be used, for example, to control a mass spectrometer in such a manner that, when a certain $MS^n$ peak has a large strength but a low identification probability, the $MS^n$ analysis of this $MS^{n-1}$ peak is avoided, or the $MS^n$ analysis of another $MS^{n-1}$ peak having a higher identification probability is preferentially performed. As a result, a larger number of substances can be identified within a shorter period of time than ever before.

BEST MODE FOR CARRYING OUT THE INVENTION

Figure 1:
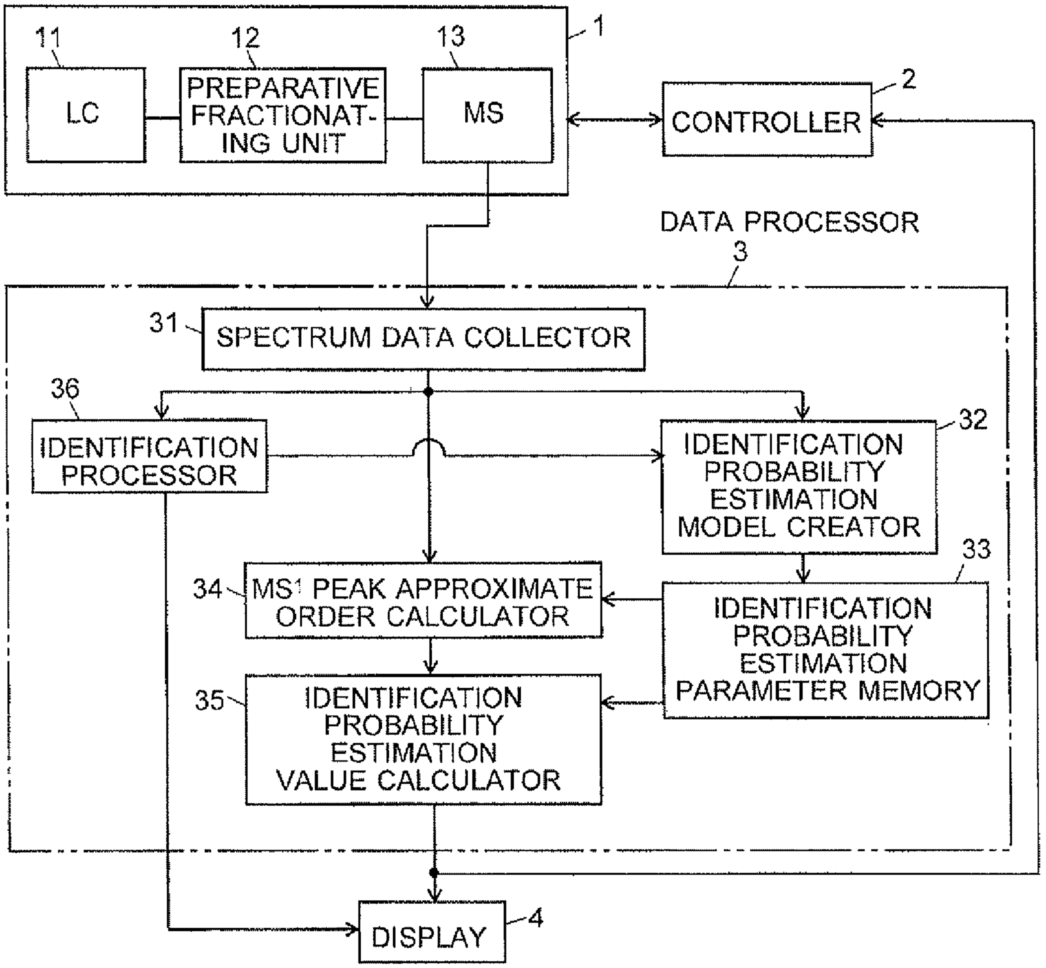
FIG. 1 is a schematic configuration diagram of a mass analyzing system for carrying out a mass spectrometry data processing method according to the present invention.

One embodiment of the method and system for processing mass spectrometry data according to the present invention and a mass spectrometer using the method is hereinafter described in detail with reference to the attached drawings.

The mass spectrometry data processing method according to the present invention is used in a mass analyzing system for performing an $MS^{n-1}$ analysis for each of a number of fractionated samples prepared by separating and fractionating a target sample by liquid chromatograph (LC) or another technique, to obtain an $MS^{n-1}$ spectrum, for selecting one or more peaks on the $MS^{n-1}$ spectrum as a precursor ion, for performing an $MS^n$ analysis using the selected precursor ion, and for analyzing the thereby obtained $MS^n$ spectrum to identify various substances contained in the target sample. In particular, the present method is characterized in the identification probability estimation process in which, for each $MS^1$ peak on the $MS^{n-1}$ spectrum, the probability that a substance will be successfully identified when the peak is selected as the precursor ion is quantitatively estimated before the $MS^n$ analysis is actually performed.

Initially, the identification probability estimation method characteristic of the present invention will be described by means of concrete examples. In the method according to the present example, $MS^2$ analyses which respectively use, as the precursor ion, $MS^1$ peaks observed on an $MS^n$ spectrum are performed preliminarily, i.e. in advance of the actual estimation of the identification probability, for each of a number of fractionated samples obtained from a sample (a preparatory sample) for creating an identification probability estimation model (which is hereinafter simply called the "sample for model creation"), which is of the same kind as the target sample. Based on the results of these $MS^2$ analyses, an attempt is made to identify substances. Then, from the result of this preliminary experiment (success or failure of identification), an optimal value of a parameter for determining the order of $MS^1$ peaks and that of a parameter of the identification probability estimation model are computed and stored. When an $MS^1$ spectrum of a fractionated sample obtained from the target sample has been obtained, the identification probability of an $MS^2$ spectrum using any MS peak as the precursor ion is estimated beforehand with reference to the stored parameter for determining the $MS^1$ peak order and the parameter of the identification probability estimation model. Thus, the present identification probability estimation method largely includes two processes: one is the preliminary process (identification probability estimation model creation process), in which the identification probability estimation model is created from given $MS^1$ spectrum data for creating an identification probability estimation model, and the aforementioned parameters are computed; the other is the estimation process, in which the identification probability for a specific $MS^1$ peak is estimated from given $MS^1$ spectrum data, and the estimated result is outputted.

Figure 2:
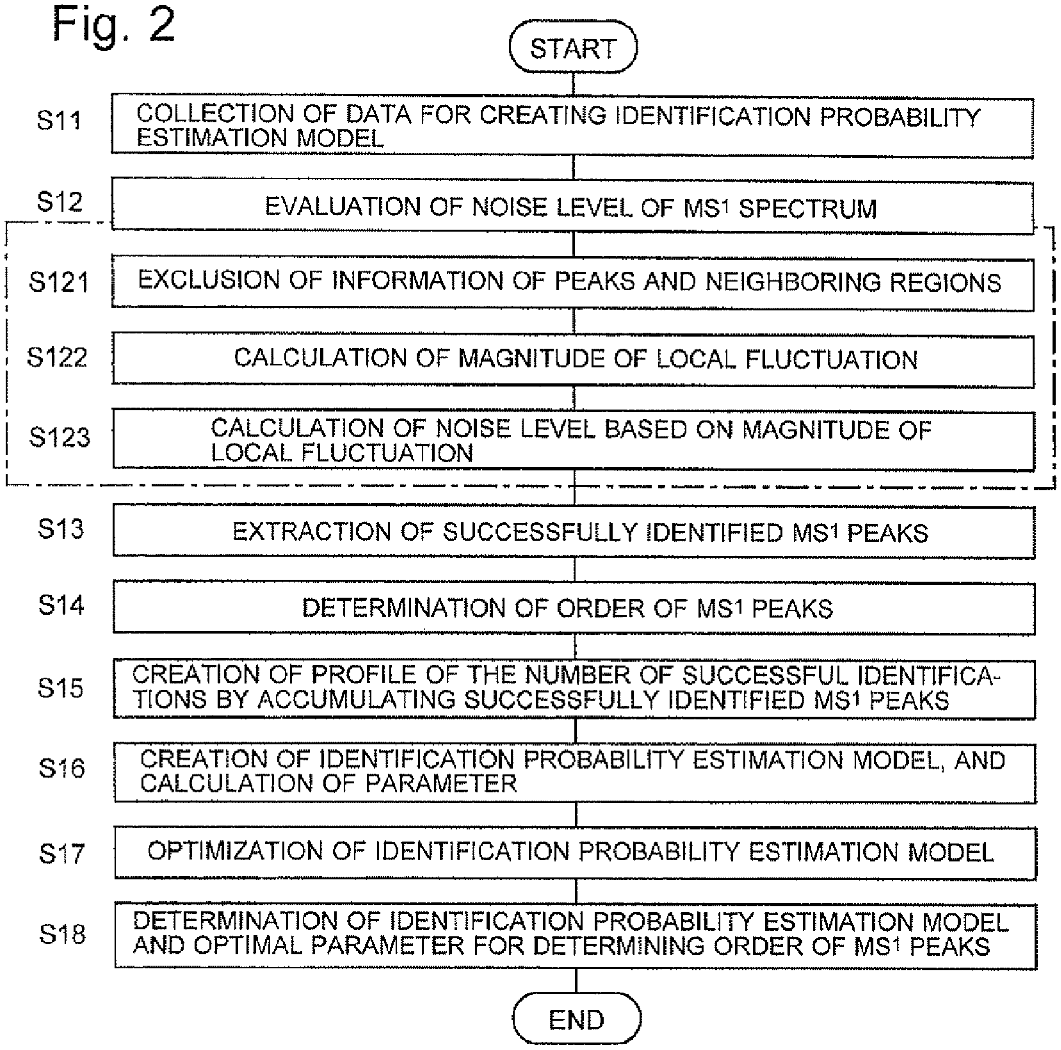
FIG. 2 is a flowchart showing a process of creating an identification probability estimation model in the mass spectrometry data processing method according to the present invention.

FIG. 2 is a flowchart showing the procedure of creating an identification probability estimation model. According to this chart, the process steps will be hereinafter described.

[Step S11] Collection of Data for Creating Identification Probability Estimation Model Initially, an $MS^1$ analysis is performed for each of a number of fractionated samples obtained from the sample for model creation, to collect $MS^1$ analysis data. Then, for each of the $MS^1$ peaks extracted from the $MS^1$ analysis data, an $MS^2$ analysis is performed to collect $MS^2$ analysis data, after which an identification process using the collected $MS^2$ analysis data is attempted. In the case of identifying substances contained in each of the fractionated samples separated according to the retention time in the previously described manner, the $MS^1$ spectra of the fractionated samples are aligned in order of retention time to construct a three-dimensional $MS^1$ spectrum. Then, a peak detecting process is performed on the two-dimensional plane of the mass-to-charge-ratio and retention time of this spectrum to extract $MS^1$ peaks. With the mass-to-charge ratio of each of these peaks as the precursor ion, an $MS^2$ analysis is performed to obtain an $MS^2$ spectrum. Based on this $MS^2$ spectrum, an identification of the substances is attempted by a predetermined identification algorithm (such as de novo sequencing or MS/MS ion search). This identification process is performed for each $MS^1$ peak. Whether the attempt of identification has resulted in success or failure (no substances identified) is determined for each $MS^1$ peak extracted from the three-dimensional spectrum.

[Step S12] Evaluation of Noise Level of $MS^1$ Spectrum

The identification probability, which will be described later, is affected by the noise level of the $MS^1$ spectrum. To deal with this problem, the noise level of the $MS^1$ spectrums obtained from the sample for model creation is evaluated. In the present example, the noise level is evaluated for each fractionated sample, i.e. for each $MS^1$ spectrum, by the following Steps S121-S123, based on an $MS^1$ raw profile (which is hereinafter simply called the "raw profile") created from raw (unprocessed) data obtained by an $MS^1$ analysis. In the following description, the signal intensity of a discretized raw profile is denoted by $R_m$, where m=0, 1, . . . is a number indicating the order of mass-to-charge ratios of the sampling points on the raw profile of a sample to be evaluated. The entire set of sampling points included in a raw profile is denoted by M.

[Step S121] Exclusion of Information of Peaks and Neighboring Regions

Let $P^{(max)}$ denote the maximum peak strength of the raw profile. That is to say, $P^{max)}$ is defined as follows:

$$P^{(max)} = \max_{(m \in M)} R_m \quad (1).$$

Figure 4A:
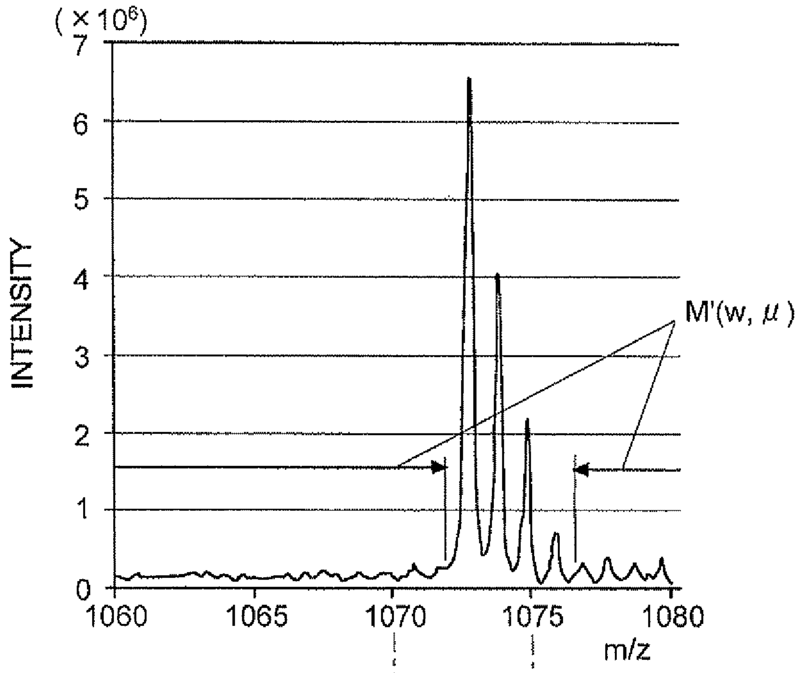
FIGS. 4A and 4B are charts showing an example of the $MS^1$ profile (mass spectrum) for explaining a noise level evaluation process.
Figure 4B:
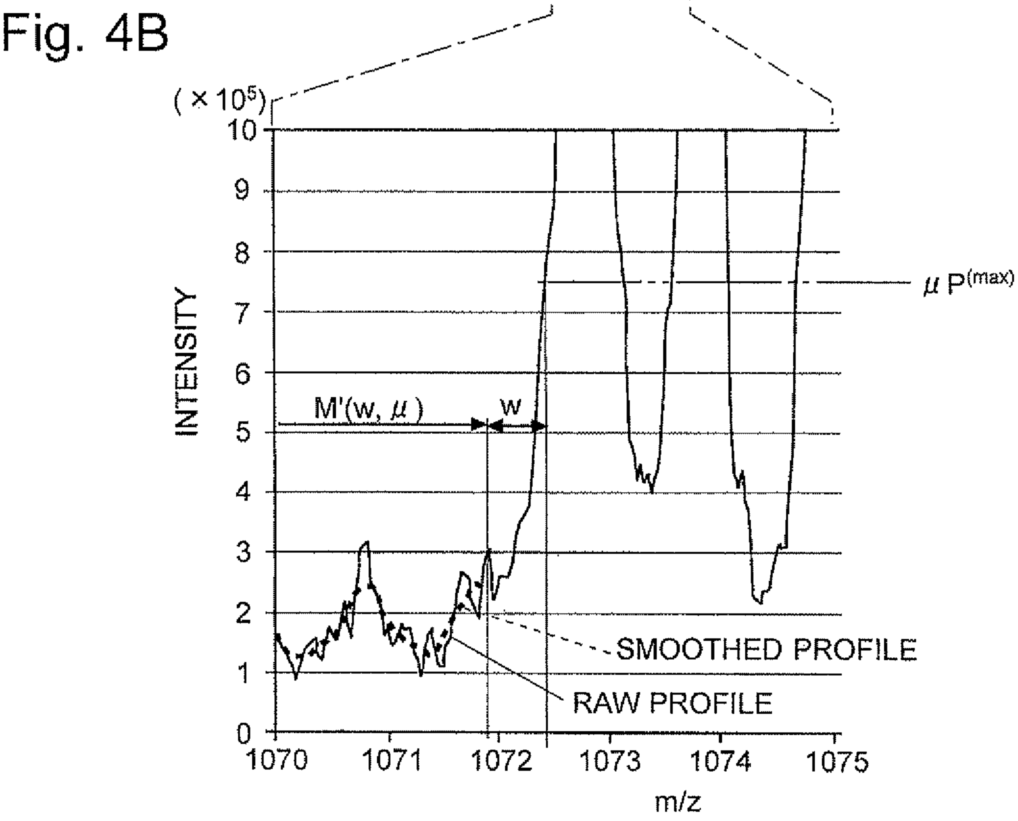

With an appropriately selected threshold μ for determining the neighboring region of a peak (0<μ<1), any sampling point having a strength equal to or greater than μ times the $P^{(max)}$ are regarded as a portion of the peak. A set of sampling points M'(w, μ) which corresponds to the entire group of the sampling points exclusive of those included in the peak sections (i.e. exclusive of any sampling point whose distance from the nearest sampling point having a strength of $\mu P^{(max)}$ or greater is equal to or smaller than w) is determined. For example, FIGS. 4A and 4B show a set of sampling points M'(w, μ) determined in a raw profile of an $MS^1$ spectrum. FIG. 4B is an enlargement of a portion of FIG. 4A, showing a range from ink 1070 to m/z 1075.

[Step S122] Calculation of Magnitude of Local Fluctuation

In the set of sampling points M'(w, μ) exclusive of the peaks and neighboring regions, the raw profile is smoothed by a filter with a pass band of half width w, to obtain a smoothed profile $*R_m(w, \mu)$. That is to say, $*R_m(w, \mu)$ is given by the following equation:

$$*R_m(w,\mu) = \{1/(2w+1)\} \sum_{(m \in M'(w,\mu))} R_m \quad (2),$$

In equation (2), Σ is the sum of $R_m$ from m'=−w to m'=w. The difference between this smoothed profile $*R_m(w, \mu)$ and the original raw profile is defined as the magnitude of local fluctuation, which is hereinafter expressed as $\Delta R_m(w, \mu)$. That is to say, $\Delta R_m(w, \mu)$ is given by the following equation:

$$\Delta R_m(w,\mu) = R_m - *R_m(w,\mu) \quad (3).$$

[Step S123] Calculation of Noise Level Based on Magnitude of Local Fluctuation

In this example, the noise level $N(R_m; w, \mu)$ is defined as the root mean square of the magnitude of local fluctuation $\Delta R_m(w, \mu)$ multiplied by c, where c is an appropriate constant for defining the noise level. That is to say, $N(R_m; w, \mu)$ is defined by the following equation:

$$N(R_m;w,\mu) = c\sqrt{\{\Sigma \Delta R_m(w,\mu)^2\}} \quad (4).$$

It should be noted that the definition of the noise level is not limited to this one; any form of definition is allowed as long as it appropriately represents the noise level of $MS^1$ spectra.

Figure 5:
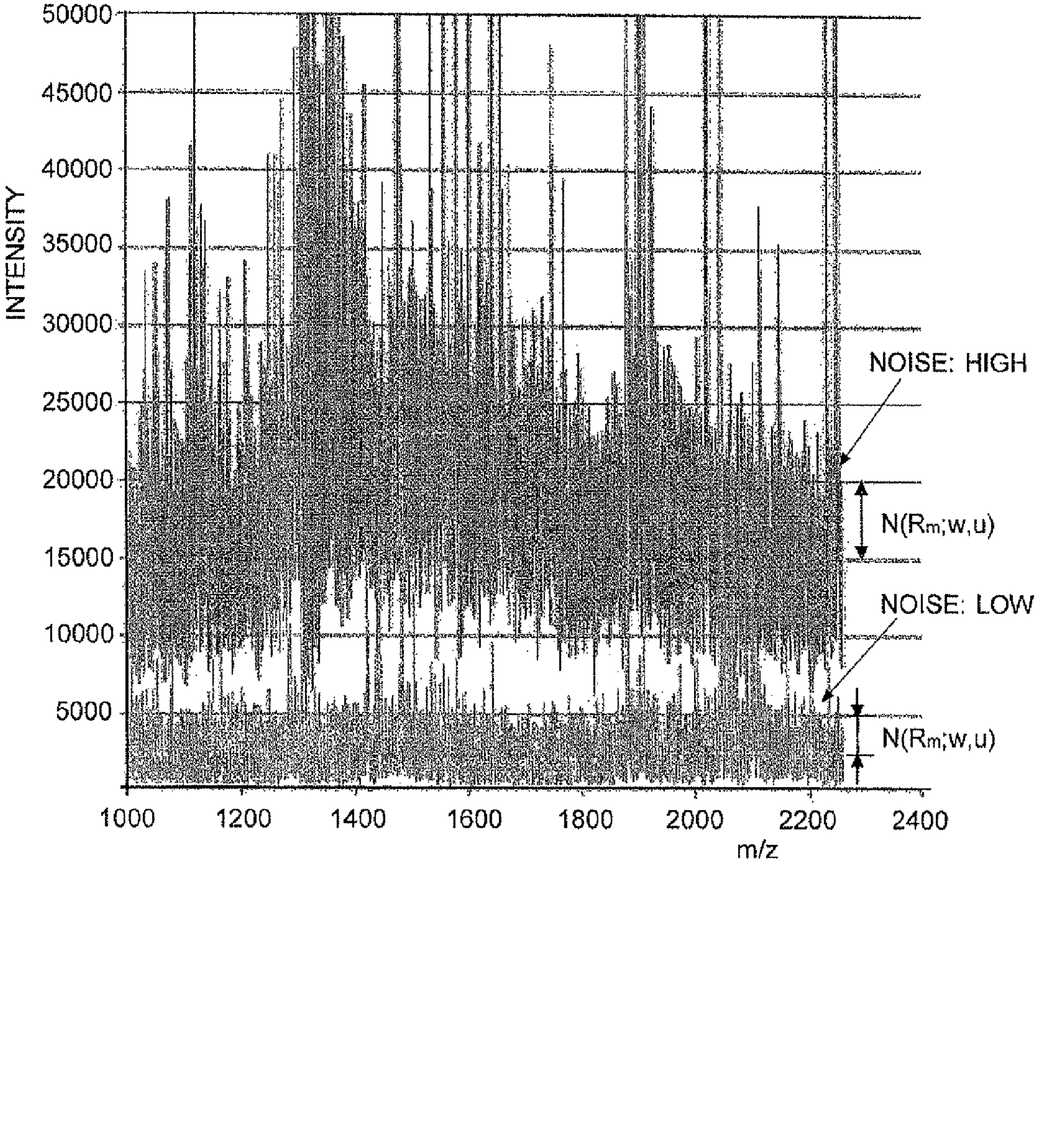
FIG. 5 is a chart showing an example of the result of a calculation of the noise level for two $MS^1$ profiles.

FIG. 5 shows the result of one example in which the noise level $N(R_m; w, \mu)$ was calculated in the previously described manner based on two actually obtained $MS^1$ raw profiles.

[Step S13] Extraction of Successfully Identified $MS^1$ Peaks

Figure 6:
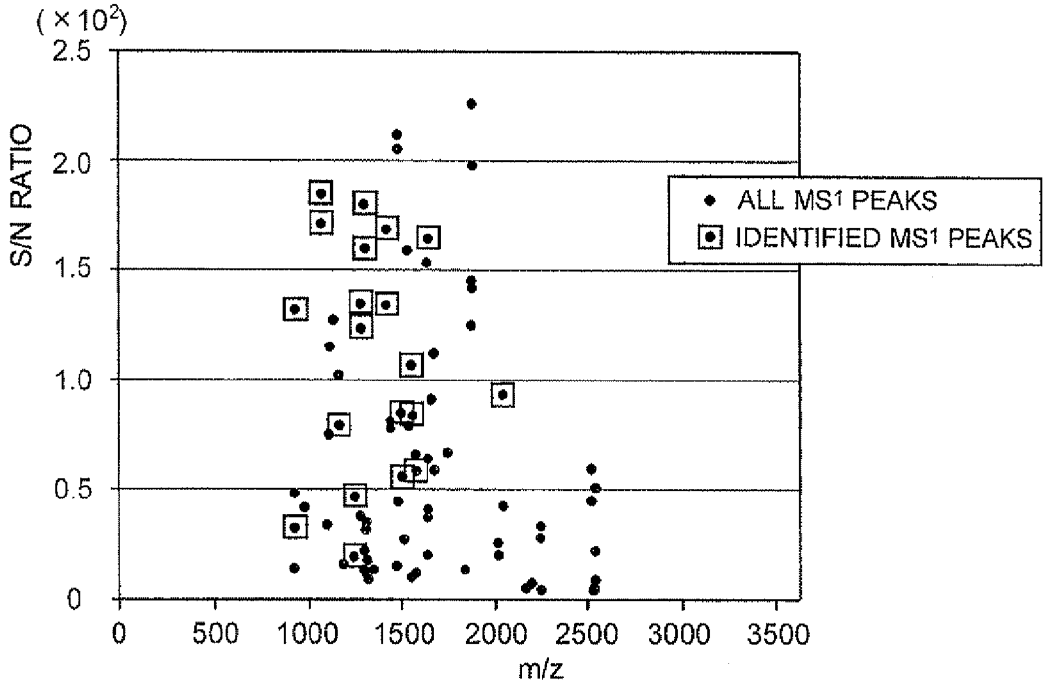
FIG. 6 is a chart showing a distribution of $MS^1$ peaks with respect to the mass-to-charge ratio m/z and the S/N ratio.

FIG. 6 is an example of the chart on which the S/N ratios and the mass-to-charge ratios of all the $MS^1$ peaks originating from a sample for model creation are plotted. The S/N ratio is the ratio of the peak strength to the noise level calculated in Step S12. Each of the dots (plot points) in FIG. 6 represents one $MS^1$ peak. A plot point with a square superimposed thereon indicates that a substance could be identified by an $MS^2$ analysis using the corresponding $MS^1$ peak as the precursor ion, i.e. that the $MS^1$ peak was successfully identified. FIG. 6 suggests that, in the present example, the percentage of successfully identified $MS^1$ peaks tends to increase with the S/N ratio. It can also be said that, among $MS^1$ peaks of the same S/N ratio, a peak having a smaller mass-to-charge ratio m/z is more likely to be successfully identified. That is to say, in the present example, the $MS^1$ peaks which result in successful identification are more likely to be found in the upper left area on the plane having the coordinate axes of mass-to-charge ratio m/z and S/N ratio.

[Step S14] Determination of Order of $MS^1$ Peaks

Subsequently, the order of $MS^1$ peaks is determined, based on the result of distribution of all the $MS^1$ peaks on the aforementioned plane defined by the two axes of mass-to-charge ratio m/z and S/N ratio. In the present example, a feature quantity (scalar value) characterizing each $MS^1$ peak is defined as follows to determine the order of $MS^1$ peaks.

Figure 7:
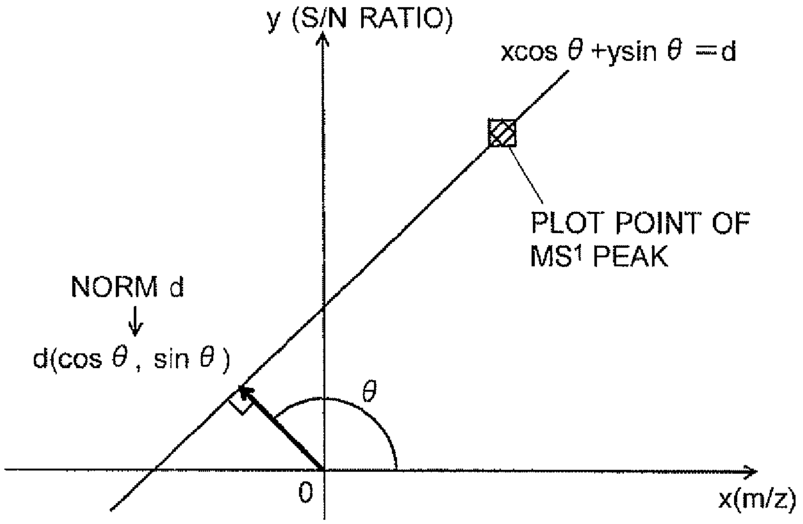
FIG. 7 is a diagram for explaining a method of calculating a feature quantity d of an $MS^1$ peak.

As shown in FIG. 7, the mass-to-charge ratio m/z and the S/N ratio are respectively assigned to the x and y axes. For a fixed value of angle θ (0°≤θ≤180°, a group of straight lines x cos θ+y sin θ=d, all being perpendicular to a normal vector (cos θ, sin θ) with the initial point at the origin, are considered. Holding the angle θ at a fixed value means that all the lines x cos θ−y sin θ=d are parallel to each other. Under this condition, as shown in FIG. 7, d is equal to the (signed) distance of the line x cos θ+y sin θ=d from the origin. The value of d increases as the line x cos θ+y sin θ=d is translated upward on the x-y plane. A method for choosing an optimal angle θ will be explained later. With the group of straight lines thus defined, the distance d from the origin to the line passing through a plot point representing an $MS^1$ peak concerned is calculated as the feature quantity of that $MS^1$ peak. Then, all the $MS^1$ peaks are arranged in descending order of feature quantity, i.e. distance d. Thus, the order of $MS^1$ peaks is determined.

Figure 8:
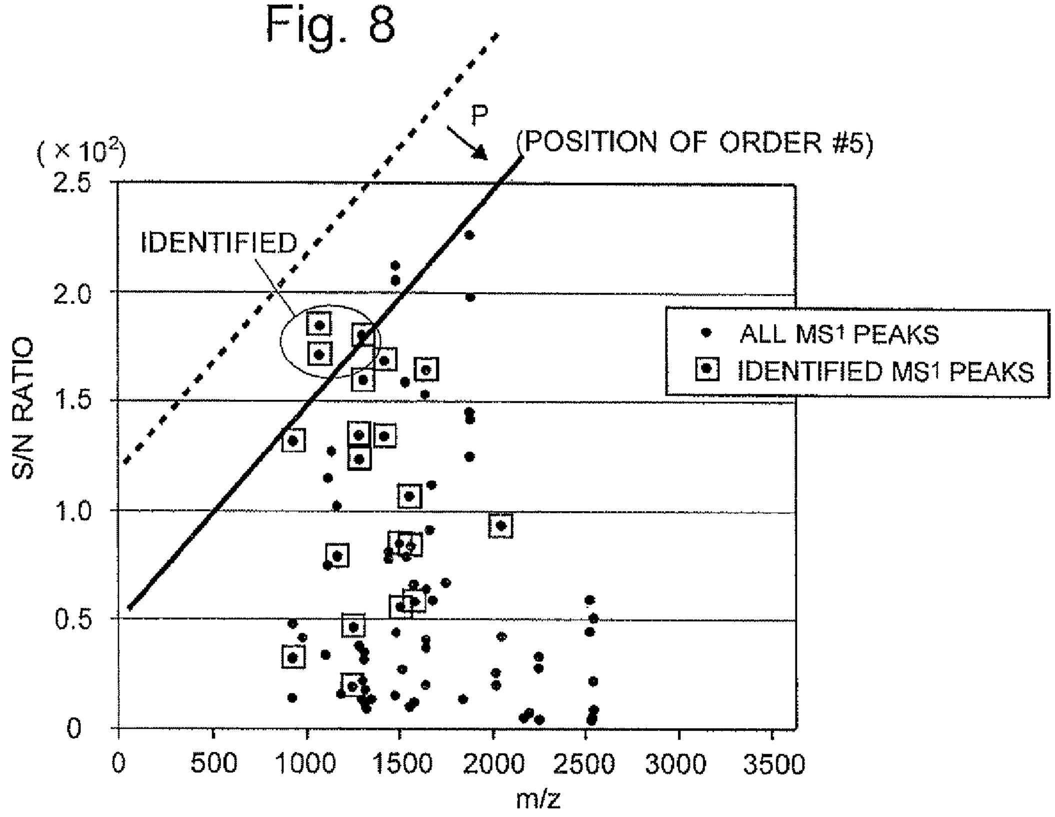
FIG. 8 is a chart for explaining a method of computing the cumulative number of successfully identified $MS^1$ peaks.

[Step S15] Creation of Profile of the Number of Successful Identifications by Accumulating Successfully Identified $MS^1$ Peaks Let us consider how many $MS^1$ peaks result in successful identification through a series of $MS^2$ analyses in which $MS^1$ peaks are sequentially and individually selected as the precursor ion according to the order determined in the aforementioned manner. FIG. 8 is one example, which shows that, if $MS^2$ analyses are performed for five $MS^1$ peaks of order numbers 1 through 5 while translating the line P downward, the identification will be successful at three $MS^1$ peaks. While the $MS^1$ peaks are sequentially selected in order of priority and an $MS^2$ analysis is performed for each peak to attempt identification, if the cumulative number of successfully identified $MS^1$ peaks is counted, a staircase-like profile as shown by the solid line in FIG. 9 will be obtained.

Figure 9:
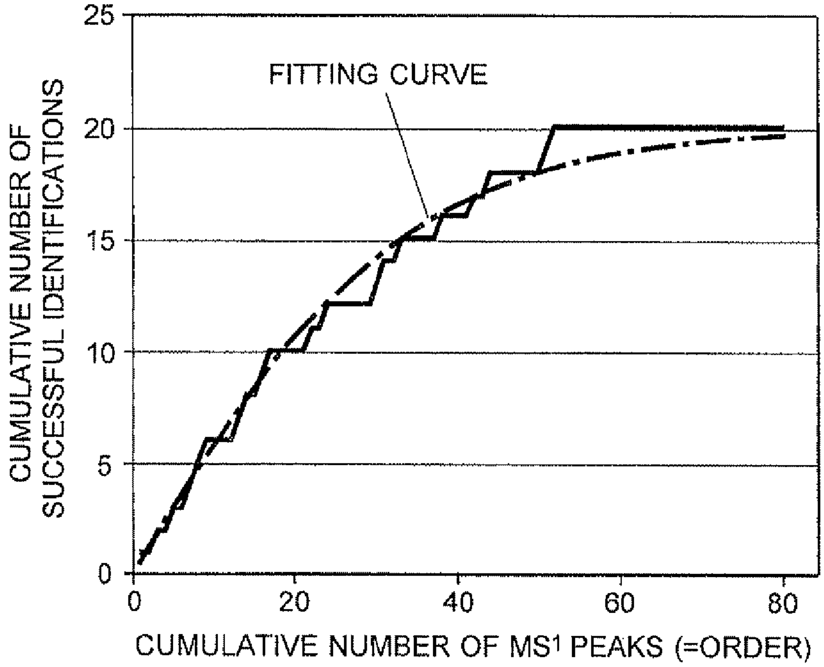
FIG. 9 is a graph showing a change in the cumulative number of the successfully identified $MS^1$ peaks and the result of a fitting operation for that change.

[Step S16] Creation of Identification Probability Estimation Model, and Calculation of Parameter A fitting operation using an analytical function is performed on the staircase-like profile to determine a smooth curve representing the relationship between the cumulative number of $MS^1$ peaks and that of successful identifications. In the present example, a hyperbolic function expressed by the following equation was used as the fitting function:

$$N^{(indent)} \tan h(n/N^{(all)}\sigma) \quad (5),$$

where n is the number of $MS^1$ peaks placed higher than a certain level, and $N^{(ident)}$ and $N^{(all)}$ are the total number of $MS^1$ peaks and the number of successfully identified $MS^1$ peaks, respectively. The parameter σ determines the rate of rise of the fitting function, the value of which is calculated so that the function will fit the previously determined staircase-like profile. The chain line in FIG. 9 shows the curve that has been fitted to a staircase-like profile. This curve is the identification probability estimation model, and a is the parameter that specifies this model.

[Step S17] Optimization of Identification Probability Estimation Model

Figure 10:
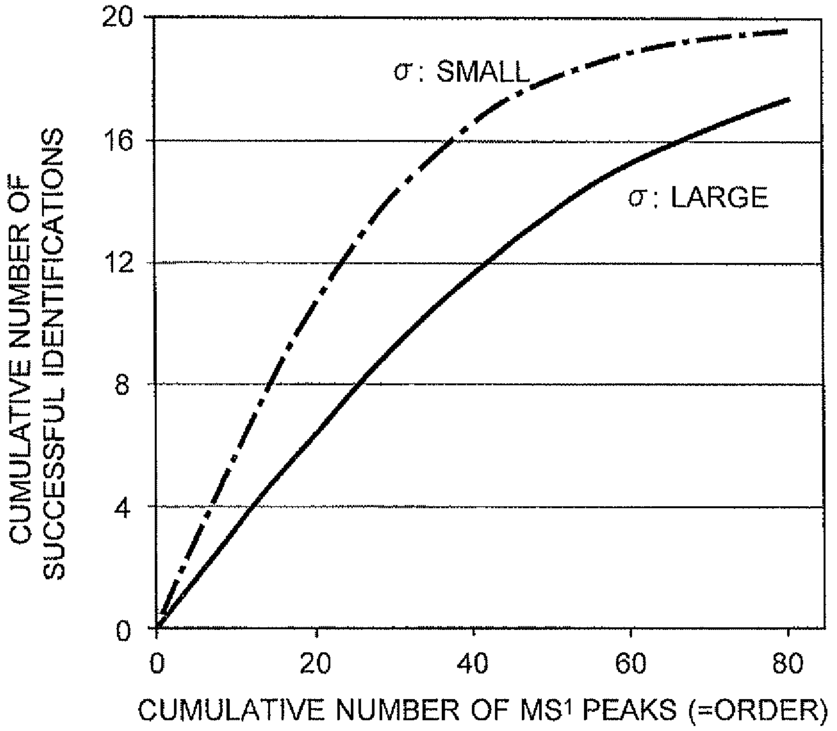
FIG. 10 is a graph showing a shift in the fitting function depending on a change in parameter 6 of the identification probability estimation model.
Figure 11:
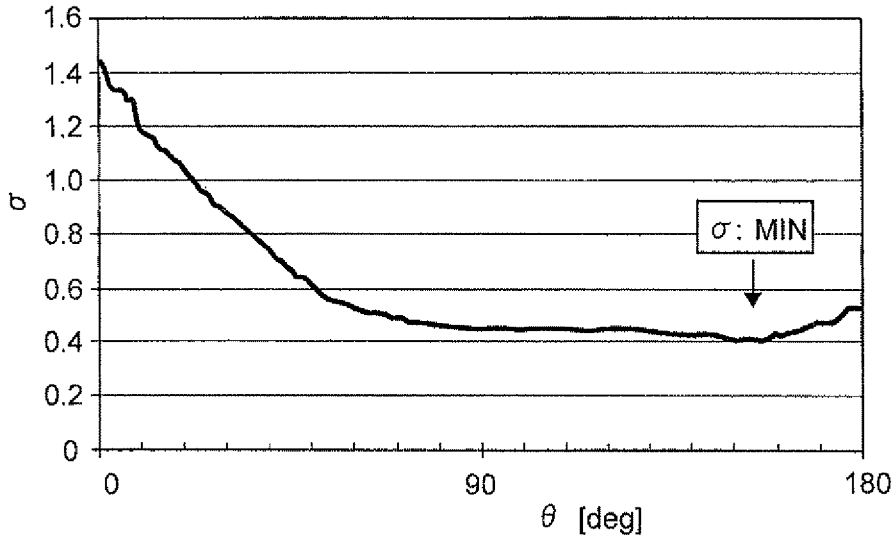
FIG. 11 is a graph showing one example of the relationship between parameter θ determining the order of $MS^1$ peaks and parameter σ of the identification probability estimation model.

The identification probability estimation model determined in Step S16 allows arbitrary selection of angle θ. For example, when θ=90°, the order of $MS^1$ peaks simply corresponds with the descending order of their S/N ratios and does not depend on the mass-to-charge ratio m/z. From the viewpoint of identifying the largest possible number of substances through the fewest possible number of $MS^2$ analyses, it can be said an order of $MS^2$ analyses in which $MS^1$ peaks resulting in successful identification are gathered at higher levels is a good order. Accordingly, it is preferable to select the angle θ so that the fitting function expressed by equation (5) rises at high rates, i.e. so that a has a small value. FIG. 10 shows two different fitting curves having different values of σ. In practice, the value of θ at which σ is minimized can be determined by calculating a in equation (5) while changing θ in FIG. 7, i.e. while changing the inclination of the line x cos θ+y sin θ—d. FIG. 11 is a graph showing the relationship between θ and a based on the example shown in FIG. 8. In this example, σ is minimized at around θ=157°. Therefore, the optimal identification probability estimation model is found at θ=157°.

In the previously described manner, the parameter σ that specifies the identification probability estimation model and the parameter θ for determining the order of $MS^1$ peaks can be calculated. These parameters can be stored in a memory to be used for the estimation of identification probability in the future (Step S18).

Figure 3:
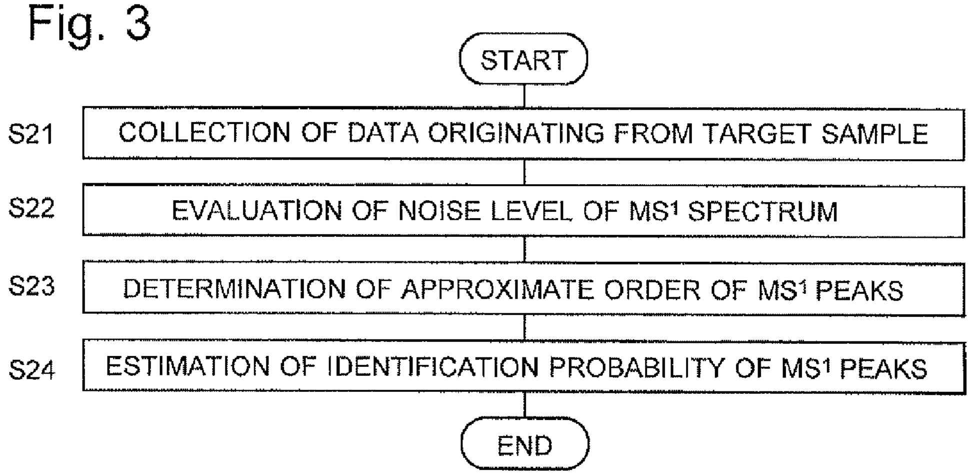
FIG. 3 is a flowchart showing a process of estimating the identification probability based on an identification probability estimation model in the mass spectrometry data processing method according to the present invention.

FIG. 3 is a flowchart showing a process of estimating an identification probability based on an $MS^1$ spectrum derived from the result of an $MS^1$ analysis of a fractionated sample obtained from a given target sample, under the condition that the aforementioned parameters have been prepared beforehand. This process is hereinafter described.

[Step S21] Collection of $MS^1$ Analysis Data Originating from Target Sample Initially, $MS^1$ analysis data of a number of fractionated samples obtained from a target sample is collected. The obtained $MS^1$ spectra of the fractionated samples are aligned in order of retention time to construct a three-dimensional $MS^1$ spectrum. Then, a peak detecting process is performed on the two-dimensional plane of the mass-to-charge-ratio and retention time of this spectrum to extract $MS^1$ peaks

[Step S22] Evaluation of Noise Level of $MS^1$ Spectrum

As in Step S12, the noise level of the $MS^1$ spectrum is evaluated for each fractionated sample.

[Step S23] Calculation of Approximate Order of $MS^1$ Peak

Figure 12:
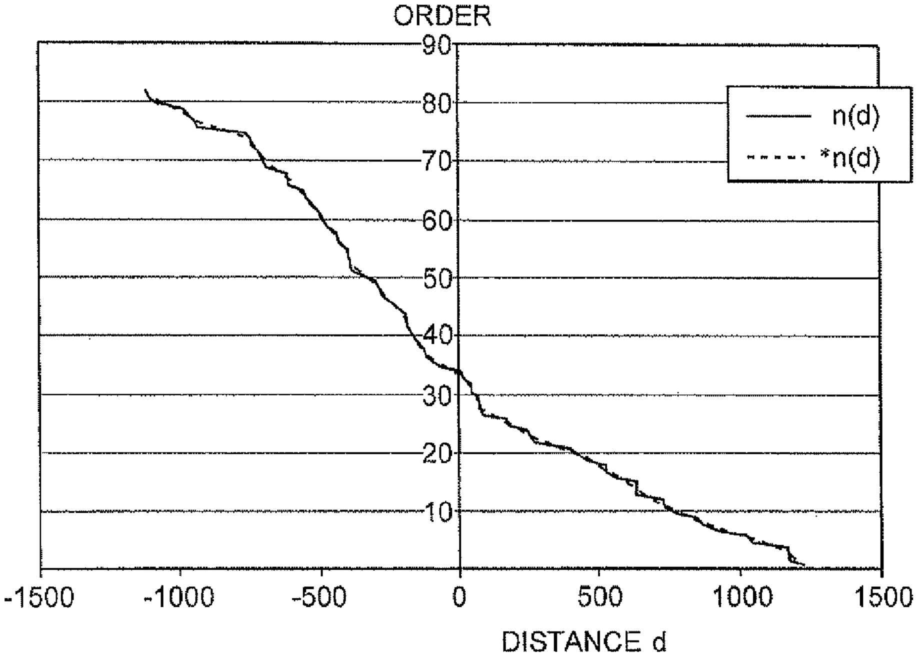
FIG. 12 is a graph showing a continuous function n(d) for determining an approximate order and a smoothed function *n(d) thereof.

The previously described method of determining the order of $MS^1$ peaks based on equation (5) uses the order values determined by d, i.e. the distance from the origin to a line drawn on the basis of a set of $MS^1$ peaks used for determining the optimal values of 0 and a (these peaks are hereinafter called the "$MS^1$ peaks for optimization"). These order values cannot be directly applied to the other $MS^1$ peaks. For appropriate determination of the order of $MS^1$ peaks having arbitrary mass-to-charge ratios m/z and S/N ratios, a continuous function n(d) is introduced, using the distance d from the origin to the line x cos θ+y sin θ=d passing through the plot point corresponding to an arbitrary mass-to-charge ratio m/z and S/N ratio in FIG. 6 or 8. For example, this continuous function n(d) may be a function whose values at the $MS^1$ peaks for optimization are the same as those calculated on the basis of equation (5) and whose values at other points are calculated by interpolation. In practice, it is preferable to use a function *n(d) created by smoothing n(d) so that the approximate order values will be plotted on a smoother curve. FIG. 12 is a chart showing one example of the continuous function n(d) for approximately determining the order and a smoothed function *n(d) thereof.

To determine an approximate order value of each $MS^1$ peak extracted in Step S21, the $MS^1$ peaks are plotted on the two-dimensional plane having the two axes of mass-to-charge ratio m/z and S/N ratio as shown in FIG. 8. Since parameter θ, which determines the order of $MS^1$ peaks, is also stored together with parameter σ, it is possible to determine the inclination of the line P to be drawn to determine the order of the peaks on FIG. 8. This line P is translated so that it passes through each of the plot points of the $MS^1$ peaks, one point after another. At each plot point, the minimal distance from the origin to the line is calculated as the distance d to be related to the corresponding $MS^1$ peak. The obtained values of the distance d are applied to the function n(d) or *n(d) shown in FIG. 12 to determine the approximate order value of each of the $MS^1$ peaks.

[Step S24] Estimation of Identification Probabilities of $MS^1$ Peaks

The inclination of the fitting function of equation (5) indicates the probability of successful identification. For example, an inclination of 1 means 100% success in the identification, while 0.5 indicates 50%. Accordingly, for each of the $MS^1$ peaks for optimization, the probability of successful determination can be estimated from the order value n of the peak by the following equation, which is a derivative of the fitting function:

$$(N^{(indent)}/N^{(all)}\sigma)\mathrm{sech}^2(n/N^{(all)}\sigma) \quad (6).$$

Figure 13:
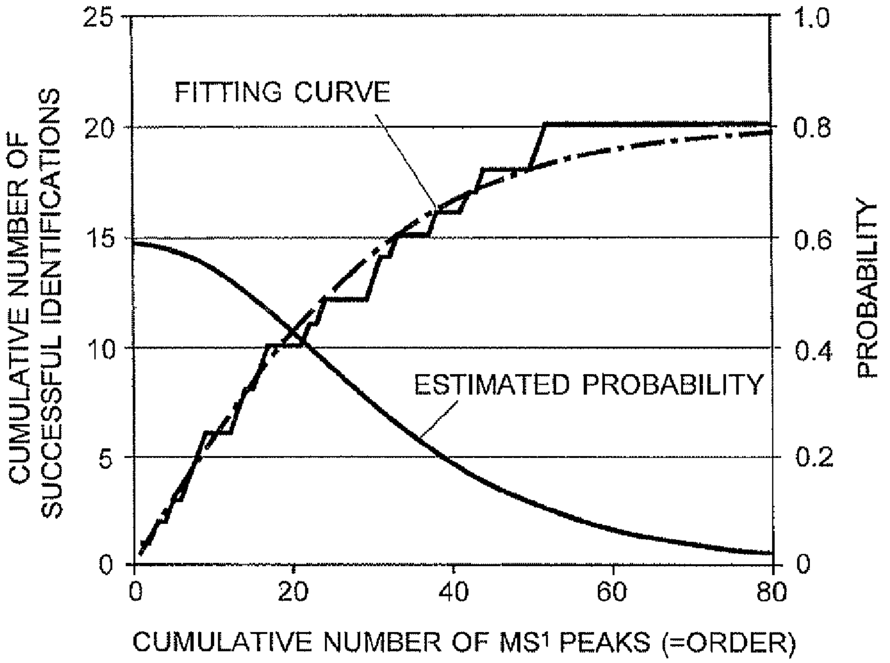
FIG. 13 is a graph showing estimated values of the identification probability for $MS^1$ peaks for optimization.

FIG. 13 shows a graph of the estimated probability expressed by the above derivative, superimposed on FIG. 9. The scale on the right side indicates the estimated probability of successful identification.

The identification probability of an $MS^1$ peak with an arbitrary mass-to-charge ratio m/z and S/N ratio by one of the following equations, using the approximate order value determined by either n(d) or *n(d) in the aforementioned manner:

$$(N^{(indent)}/N^{(all)}\sigma)\mathrm{sech}^2(n(d)/N^{(all)}\sigma) \quad (7) \text{ or}$$

$$(N^{(indent)}/N^{(all)}\sigma)\mathrm{sech}^2(*n(d)/N^{(all)}\sigma) \quad (8).$$

Figure 14:
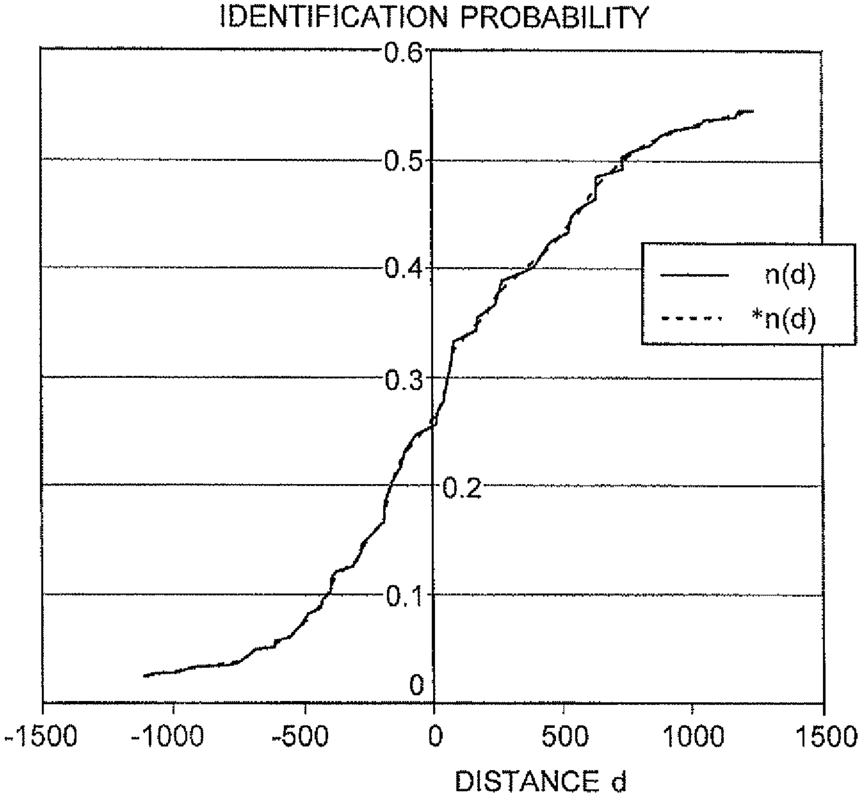
FIG. 14 is a graph showing estimated values of the identification probability for arbitrary mass-to-charge ratios m/z and S/N ratios.

That is to say, for a given $MS^1$ peak for which the identification probability needs to be estimated, once the approximate order value of this $MS^1$ peak has been determined, the identification probability can be estimated by a simple calculation using the identification probability estimation model which has already been created by the process of Steps S11 through S18. FIG. 14 is a graph showing the relationship between the distance d and the estimated value of the identification probability for an $MS^1$ peak having an arbitrary mass-to-charge ratio m/z and S/N ratio in the aforementioned example. In this figure, n(d) is the case based on equation (7), and *n(d) is the case based on equation (8).

As described thus far, in the mass spectrometry data processing method according to the present invention, after the parameter of the identification probability estimation model and the parameter for determining the order of $MS^1$ peaks are determined, the probability of successful identification using the result of an $MS^2$ analysis with an arbitrary $MS^1$ peak as the precursor ion can be quantitatively estimated, without performing the $MS^2$ analysis, by a simple calculation. Possible uses of the thus estimated identification probability will be specifically described in the following explanation of an operation of a mass spectrometer.

One embodiment of a mass spectrometer using a data processing system for performing the previously described data processing method is hereinafter described with reference to FIG. 1. FIG. 1 is a schematic configuration diagram of the mass spectrometer according to the present embodiment.

In FIG. 1, an analyzer 1 includes: a liquid chromatograph unit (LC) 11 for separating various substances in a liquid sample according to their retention times; a preparative fractionating unit 12 for performing preparative fractionation of the sample containing the substances separated in the LC unit 11 to prepare a plurality of different fractionated samples; and a mass spectrometer unit (MS) 13 for selecting one of the fractionated samples and for performing a mass spectrometry on the selected sample. The MS unit 13 is a matrix-assisted laser desorption/ionization ion-trap time-of-flight mass spectrometer (MALDI-IT-TOFMS) including a MALDI ion source, an ion trap, and a time-of-flight mass spectrometer, and is capable of not only an $MS^1$ analysis but also an $MS^n$ analysis in which the selection and dissociation of ions is repeated. In the case where only the $MS^1$ and $MS^2$ analyses are required (i.e. if no $MS^n$ analysis for n=3 or greater is necessary), it is possible to use a mass spectrometer of a simpler configuration, such as a triple quadrupole mass analyzer.

A controller 2 controls the operation of the analyzer 1. The data obtained in the MS unit 13 of the analyzer 1 are sent to a data processor 3, which processes the data and outputs the result on a display 4, for example. The data processor 3 includes, as the functional block thereof, a spectrum data collector 31 for collecting $MS^1$ or $MS^n$ analysis data, an identification probability estimation model creator 32 for performing the process corresponding to Steps S12 through S18, an identification probability estimation parameter memory 33 for storing the parameters calculated by the identification probability estimation model creator 32, an $MS^1$ peak approximate order value calculator 34 for performing the process corresponding to Steps S22 and S23, an identification probability estimation value calculator 35 for performing the process corresponding to Step S24, and an identification processor 36 for performing the identification process. The data processor 3 and controller 2 can be embodied, for example, by installing a dedicated controlling and processing software program on a personal computer prepared as the hardware resources and running the program on the same computer to realize the aforementioned functional blocks.

When performing a comprehensive identification of a target sample, the identification probability estimation value calculator 35 in the data processor 3 calculates and outputs an estimated value of the identification probability for an arbitrary $MS^1$ peak in the previously described manner. For example, in the case where, for each fractionated sample, the controller 2 performs the control of automatically selecting an observed $MS^1$ peak as the precursor ion and carrying out an $MS^2$ analysis, when the estimated value of the identification probability for that $MS^1$ peak is calculated, the controller 2 evaluates the estimated value with reference to a threshold to determine whether or not the $MS^2$ analysis should be performed for that $MS^1$ peak. Accordingly, it is possible to avoid an unnecessary $MS^2$ analysis for an $MS^1$ peak having a low probability of successful identification of a substance, so that a large number of substances can be efficiently identified. Instead of evaluating the estimated value of the identification probability for one $MS^1$ peak after another, it is possible to calculate, before performing $MS^2$ analyses, the estimated values of the identification probabilities of all the $MS^1$ peaks obtained for the target sample, extract a predetermined number of $MS^1$ peaks in descending order of the estimated value of the identification probability, and perform $MS^2$ analyses while sequentially selecting the fractionated samples in which the extracted $MS^1$ peaks can be found.

Naturally, instead of the controller 2 automatically selecting an $MS^1$ peak based on the estimated value of the identification probability, a user (analysis operator) can evaluate the estimated value of the identification probability for each $MS^1$ peak shown on the display 4 and instruct whether or not to perform an $MS^2$ analysis using the $MS^1$ peak as the precursor ion. That is to say, the analysis control based on the estimated value of the identification probability may be made by a manual operation.

For ease of explanation, the previous embodiment handled only the case of estimating the identification probability of $MS^1$ peaks. However, it should be naturally understood that the same technique is also applicable to the case of estimating the identification probability of each of the $MS^{n-1}$ peaks before $MS^1$ analyses which respectively use the $MS^{n-1}$ peaks as the precursor ions are performed.

It should be noted that the previous embodiment is a mere example of the present invention, and any change, modification or addition appropriately made within the spirit of the present invention will naturally fall within the scope of claims of this patent application.

EXPLANATION OF NUMERALS

1 . . . Analyzer
11 . . . Liquid Chromatograph Unit (LC)
12 . . . Preparative Fractionating Unit
13 . . . Mass Spectrometer Unit (MS)
2 . . . Controller
3 . . . Data Processor
31 . . . Spectrum Data Collector
32 . . . Identification Probability Estimation Model Creator
33 . . . Identification Probability Estimation Parameter Memory
34 . . . $MS^1$ Peak Approximate Order Calculator
35 . . . Identification Probability Estimation Value Calculator.
36 . . . Identification Processor
4 . . . Display

The invention claimed is:

1. A mass spectrometry data processing method for identifying a substance contained in each of a plurality of fractionated samples obtained by separating various substances contained in a sample according to a predetermined separation parameter and fractionating the sample, based on $MS^n$ spectra obtained by $MS^n$ analyses (where n is an integer equal to or greater than two) respectively performed for the plurality of fractionated samples, comprising:

a) an identification probability estimation model creation step, in which: (a1) order information for determining an order of $MS^{n-1}$ peaks found by $MS^{n-1}$ analyses for a plurality of fractionated samples obtained by separating and fractionating a preparatory sample is derived from information on the $MS^{n-1}$ peaks and a result of substance identification, which includes successful and unsuccessful identification of a substance in each of the plurality of fractionated samples when substances contained in each of the plurality of fractionated samples are attempted to be identified based on results of $MS^n$ analyses which respectively use the $MS^{n-1}$ peaks as a precursor ion, (a2) an identification probability estimation model is created on a basis of a relationship between a cumulative number of $MS^n$ peaks and a number of successful identifications that specify a substance with sufficient accuracy determined through a series of $MS^n$ analyses and identifications in which a plurality of $MS^{n-1}$ peaks originating from a same kind of sample are sequentially selected as a precursor ion according to the aforementioned order, and (a3) the aforementioned order information, and identification probability estimation model information representing the aforementioned identification probability estimation model, are memorized;

b) a peak order calculation step, in which, for $MS^{n-1}$ peaks found by an $MS^{n-1}$ analysis of at least one fractionated sample obtained from a sample to be identified, the order of the $MS^{n-1}$ peaks is calculated by using the order information; and c) an identification probability estimation step, in which an estimated value of the identification probability of each of the $MS^{n-1}$ peak is calculated from the order of the $MS^{n-1}$ peaks calculated in the peak order calculation step, with reference to the identification probability estimation model derived from the identification probability estimation model information, wherein the estimated value of the identification probability for an $MS^n$ analysis and identification using, as a precursor ion, an $MS^{n-1}$ peak corresponding to a fractionated sample obtained from the sample to be identified is obtained before the $MS^n$ analysis is performed.

2. The mass spectrometry data processing method according to claim 1, wherein the identification probability estimation model creation step includes examining a distribution of the $MS^{n-1}$ peaks based on their mass-to-charge ratios and S/N ratios, and determining their order so that a high order of priority is given to each $MS^{n-1}$ peak included in an area dense with $MS^{n-1}$ peaks which have resulted in successful identification.

3. A mass spectrometry data processing system for identifying a substance contained in each of a plurality of fractionated samples obtained by separating various substances contained in a sample according to a predetermined separation parameter and fractionating the sample, based on $MS^n$ spectra obtained by $MS^n$ analyses (where n is an integer equal to or greater than two) respectively performed for the plurality of fractionated samples, comprising:

a) an identification probability estimation information memory for storing order information and identification probability estimation model information, where the order information which determines an order of $MS^{n-1}$ peaks found by $MS^{n-1}$ analyses for a plurality of fractionated samples obtained by separating and fractionating a preparatory sample is derived from information on the $MS^{n-1}$ peaks and a result of substance identification, which includes successful and unsuccessful identification of a substance in each of the plurality of fractionated samples when substances contained in each of the plurality of fractionated samples are attempted to be identified based on results of $MS^n$ analyses which respectively use the $MS^{n-1}$ peaks as a precursor ion, and the identification probability estimation model information represents an identification probability estimation model created on a basis of a relationship between a cumulative number of $MS^n$ peaks and a number of successful identifications that specify a substance with sufficient accuracy, determined through a series of $MS^n$ analyses and identifications in which a plurality of $MS^{n-1}$ peaks originating from a same kind of sample are sequentially selected as a precursor ion according to the aforementioned order;

b) a peak order calculator for calculating an order of $MS^{n-1}$ peaks found by an $MS^{n-1}$ analysis of at least one fractionated sample obtained from a sample to be identified, using the order information stored in the identification probability estimation information memory; and c) an identification probability estimator for calculating an estimated value of the identification probability of an $MS^{n-1}$ peak from the order of the $MS^{n-1}$ peaks calculated by the peak order calculator with reference to the identification probability estimation model derived from the identification probability estimation model information stored in the identification probability estimation information memory.

4. The mass spectrometry data processing system according to claim 3, wherein the identification probability estimation model is created by examining a distribution of the $MS^{n-1}$ peaks based on their mass-to-charge ratios and S/N ratios, and determining their order so that a high order of priority is given to each $MS^{n-1}$ peak included in an area dense with $MS^{n-1}$ peaks which have resulted in successful identification.

5. The mass spectrometry data processing system according to claim 4, further comprising:

d) a precursor ion selector for obtaining, in advance of an $MS^n$ analysis of a fractionated sample obtained from a sample to be identified, an estimated value of the identification probability for an $MS^n$ analysis and identification using an $MS^{n-1}$ peak corresponding to the fractionated sample as a precursor ion, and for determining, based on the estimated result, whether or not the $MS^n$ analysis using the $MS^{n-1}$ peak as the precursor ion should be performed; and e) an analysis controller for performing an $MS^n$ analysis using, as the precursor ion, an $MS^{n-1}$ peak for which it has been determined by the precursor ion selector that the $MS^n$ analysis should be performed.

6. The mass spectrometry data processing system according to claim 3, further comprising:

d) a precursor ion selector for obtaining, in advance of an $MS^n$ analysis of a fractionated sample obtained from a sample to be identified, an estimated value of the identification probability for an $MS^n$ analysis and identification using an $MS^{n-1}$ peak corresponding to the fractionated sample as a precursor ion, and for determining, based on the estimated result, whether or not the $MS^n$ analysis using the $MS^{n-1}$ peak as the precursor ion should be performed; and e) an analysis controller for performing an $MS^n$ analysis using, as the precursor ion, an $MS^{n-1}$ peak for which it has been determined by the precursor ion selector that the $MS^n$ analysis should be performed.

* * * * *